United States Patent
O'Shea et al.

(10) Patent No.: US 12,129,925 B2
(45) Date of Patent: Oct. 29, 2024

(54) VARIABLE TUNE HYDRAULIC TENSIONER

(71) Applicant: BorgWarner, Inc., Auburn Hills, MI (US)

(72) Inventors: Fenton O'Shea, Ithaca, NY (US); Michael Smart, Groton, NY (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 18/548,434

(22) PCT Filed: Mar. 2, 2021

(86) PCT No.: PCT/US2021/020426
§ 371 (c)(1),
(2) Date: Aug. 30, 2023

(87) PCT Pub. No.: WO2022/186823
PCT Pub. Date: Sep. 9, 2022

(65) Prior Publication Data
US 2024/0133451 A1  Apr. 25, 2024
US 2024/0229903 A9  Jul. 11, 2024

(51) Int. Cl.
*F16H 7/08* (2006.01)

(52) U.S. Cl.
CPC ... *F16H 7/0836* (2013.01); *F16H 2007/0808* (2013.01); *F16H 2007/0814* (2013.01)

(58) Field of Classification Search
CPC ..... F16H 2007/0812; F16H 2007/0806; F16H 2007/0859; F16H 2007/0814; F16H 2007/0817
USPC ....................................................... 474/110
See application file for complete search history.

(56) References Cited

U.S. PATENT DOCUMENTS

| | | | | |
|---|---|---|---|---|
| 3,960,026 A | * | 6/1976 | Hibino | F16H 7/12 474/111 |
| 4,826,470 A | * | 5/1989 | Breon | F16H 7/08 474/138 |
| 5,117,786 A | * | 6/1992 | Trzmiel | F16H 7/0848 123/90.31 |
| 5,658,212 A | * | 8/1997 | Meurer | F16H 7/0838 474/111 |
| 5,879,256 A | * | 3/1999 | Tada | F16H 7/0848 474/111 |
| 5,935,031 A | * | 8/1999 | Tada | F15B 21/044 474/138 |
| 6,196,939 B1 | * | 3/2001 | Simpson | F16H 7/0848 474/138 |

(Continued)

FOREIGN PATENT DOCUMENTS

| | | |
|---|---|---|
| JP | 2006189103 A | 7/2006 |
| JP | 2014134263 A | 7/2014 |
| KR | 20160140379 A | 12/2016 |

OTHER PUBLICATIONS

International Search Report for PCT/US2021/020426 dated Dec. 2, 2021.

*Primary Examiner* — Henry Y Liu
(74) *Attorney, Agent, or Firm* — Brown & Michaels, PC

(57) ABSTRACT

One or more radial holes in the body of the hydraulic tensioner are used to control outward hydraulic flow restriction from the hydraulic pressure chamber within the piston. The one or more holes can be arranged in different ways to allow the piston position to alter the outward oil flow of the tensioner.

18 Claims, 14 Drawing Sheets

(56) References Cited

U.S. PATENT DOCUMENTS

| | | | | |
|---|---|---|---|---|
| 6,634,973 B1* | 10/2003 | Simpson | F16H 7/0848 | 474/140 |
| 8,062,157 B2* | 11/2011 | Geibel | F16H 7/0836 | 474/111 |
| 2009/0111627 A1* | 4/2009 | Geibel | F16H 7/0836 | 123/90.31 |
| 2012/0135831 A1* | 5/2012 | Perissinotto | F16H 7/0836 | 474/110 |
| 2012/0202629 A1* | 8/2012 | O'Shea | F16H 7/0836 | 474/110 |
| 2014/0187369 A1* | 7/2014 | Todd | F16H 7/0848 | 474/110 |
| 2015/0267789 A1* | 9/2015 | Kurematsu | F16H 7/08 | 474/110 |
| 2015/0292602 A1* | 10/2015 | Kurematsu | F16H 7/0848 | 474/110 |
| 2015/0354673 A1* | 12/2015 | Onoda | F16H 7/08 | 474/110 |
| 2016/0084359 A1* | 3/2016 | Wigsten | F16H 7/0848 | 474/110 |
| 2016/0123435 A1* | 5/2016 | Yoshida | F16H 7/08 | 474/110 |
| 2016/0153530 A1* | 6/2016 | Kitamura | F16H 7/08 | 474/110 |
| 2016/0186838 A1* | 6/2016 | Kurematsu | F16H 7/08 | 474/110 |
| 2017/0356529 A1* | 12/2017 | Simmons | F16H 7/0848 | |
| 2018/0363740 A1* | 12/2018 | Kimura | F16H 7/0848 | |

* cited by examiner

VARIABLE TUNE HYDRAULIC TENSIONER

BACKGROUND

The present invention relates to hydraulic tensioners, and more specifically to a body integrated, variable tune, hydraulic tensioner.

Hydraulic tensioners use engine oil pressure with spring force for chain motion and tension control for engine timing systems.

SUMMARY

According to one embodiment of the present invention one or more radial holes in the body of the hydraulic tensioner can be used to control the outward hydraulic flow restriction. The one or more holes can be arranged in different ways to allow the piston position to alter the outward oil flow of the tensioner.

DETAILED DESCRIPTION

Figure 1:
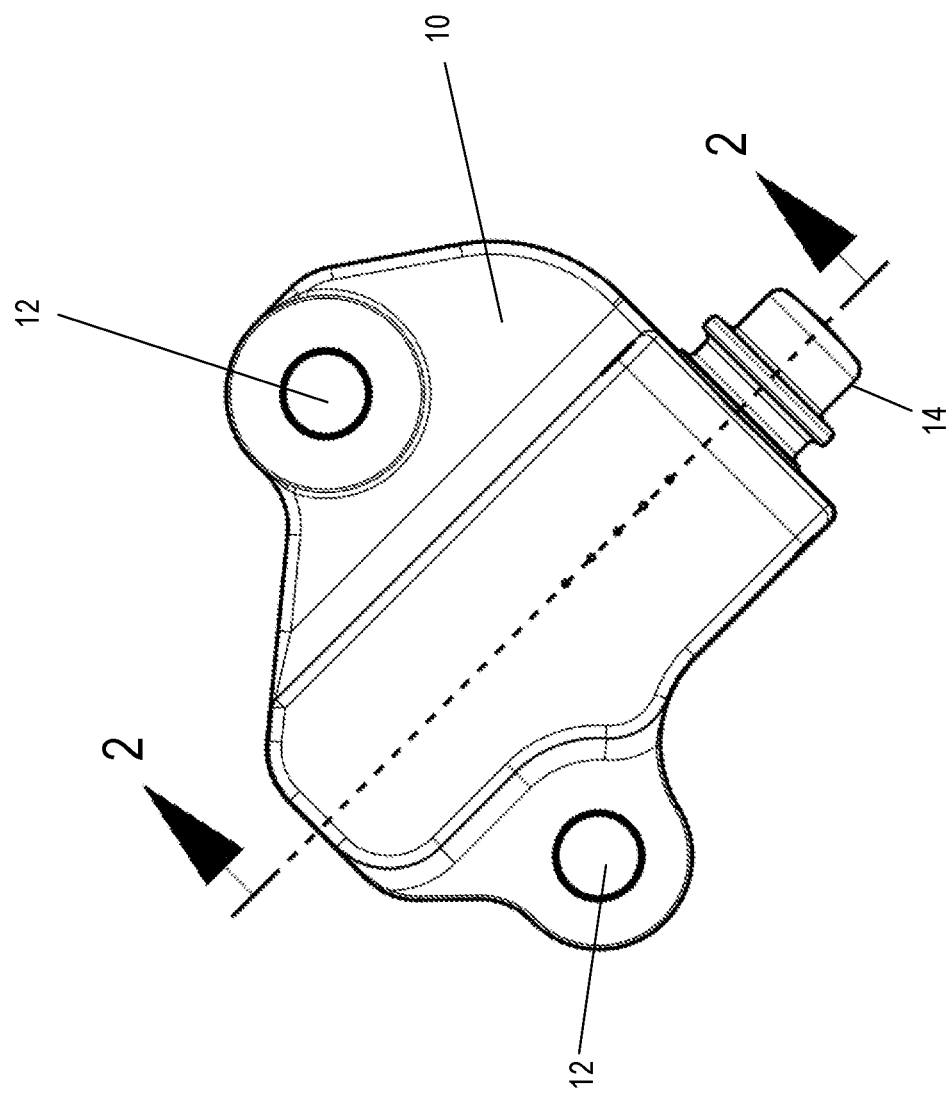
FIG. 1 shows a hydraulic tensioner in a nose down position of a first embodiment.
Figure 2:
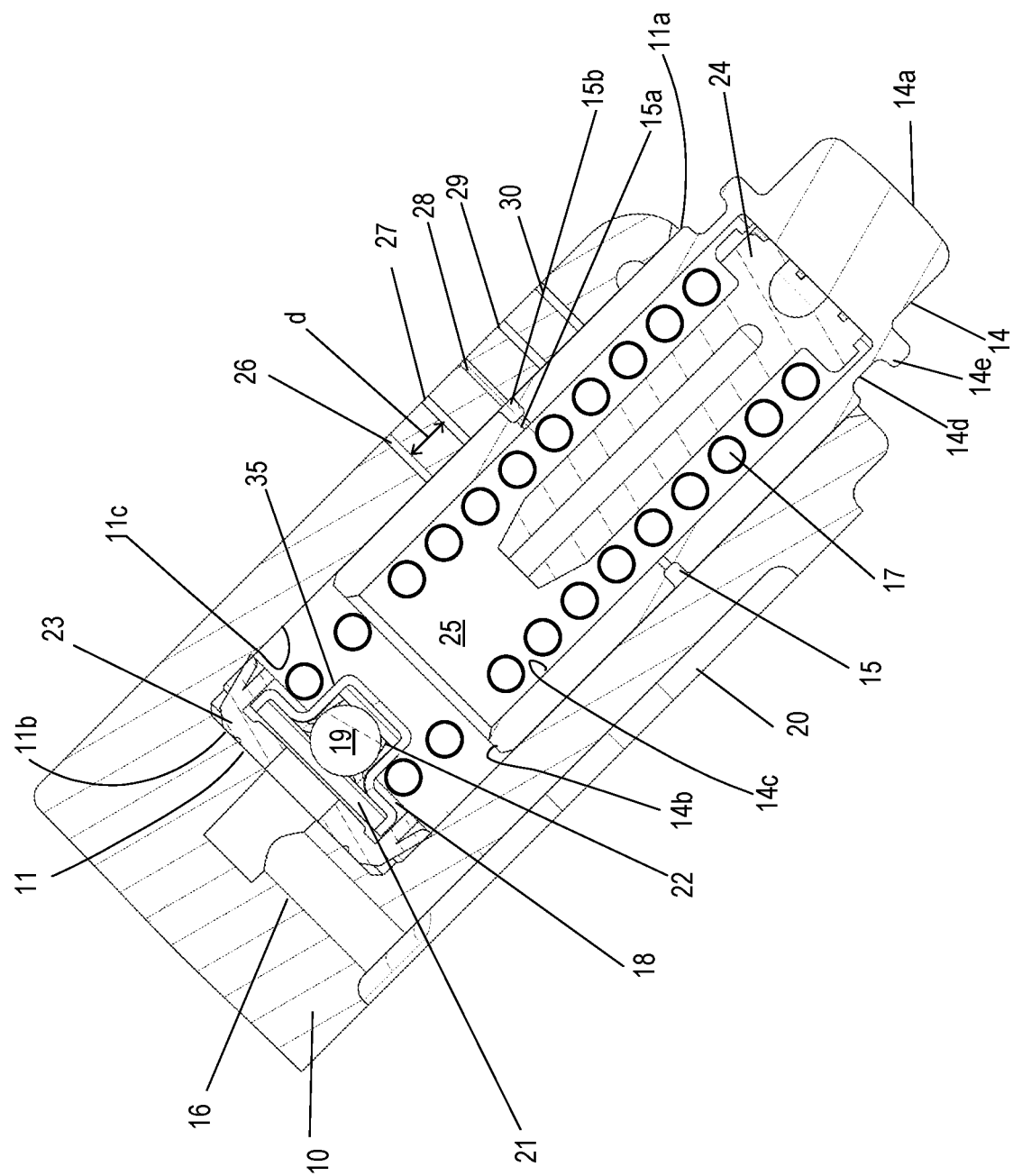
FIG. 2 shows a sectional view of FIG. 1 along line 2-2.
Figure 3:
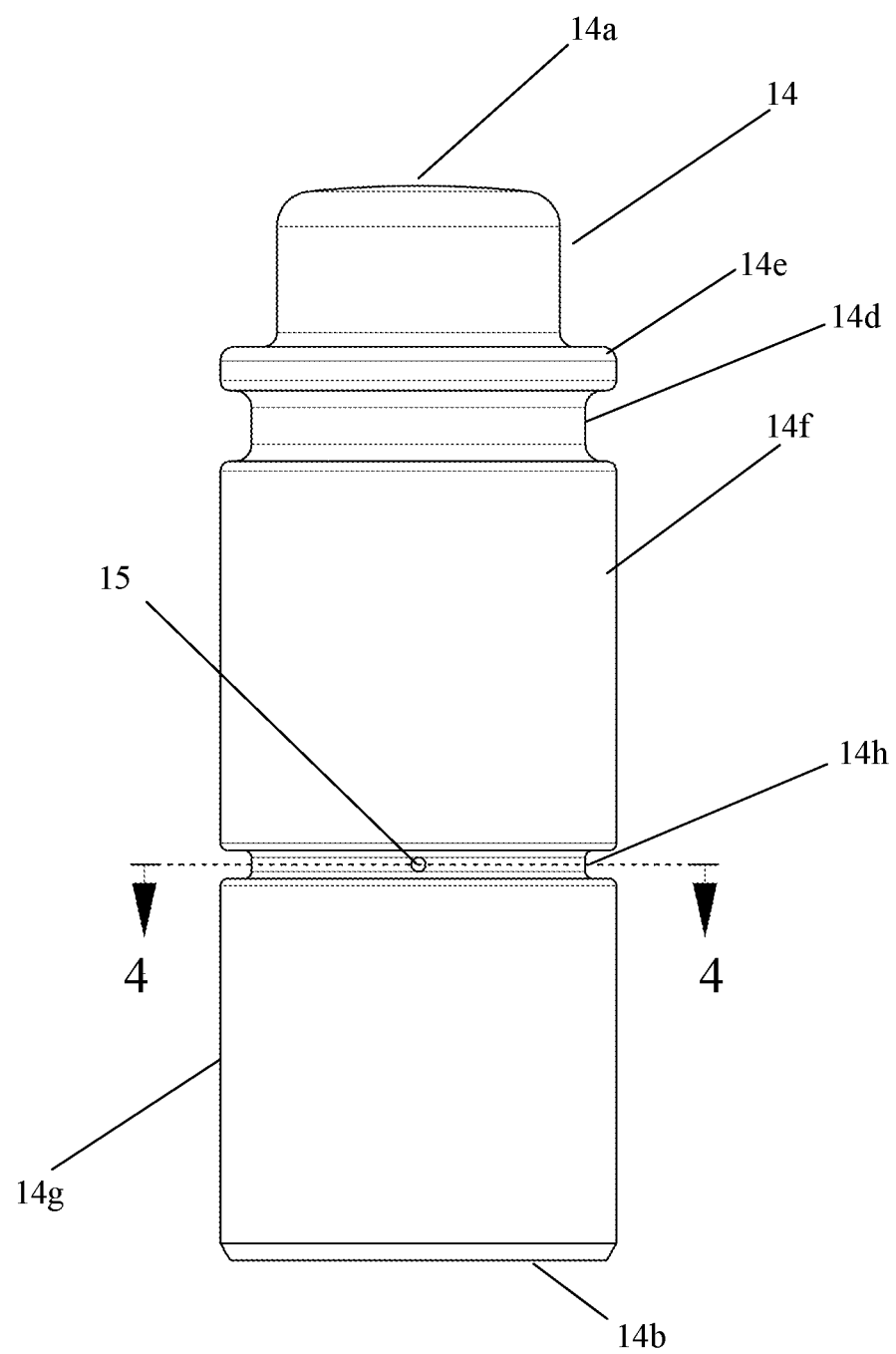
FIG. 3 shows the piston of the hydraulic tensioner of FIG. 1.
Figure 4:
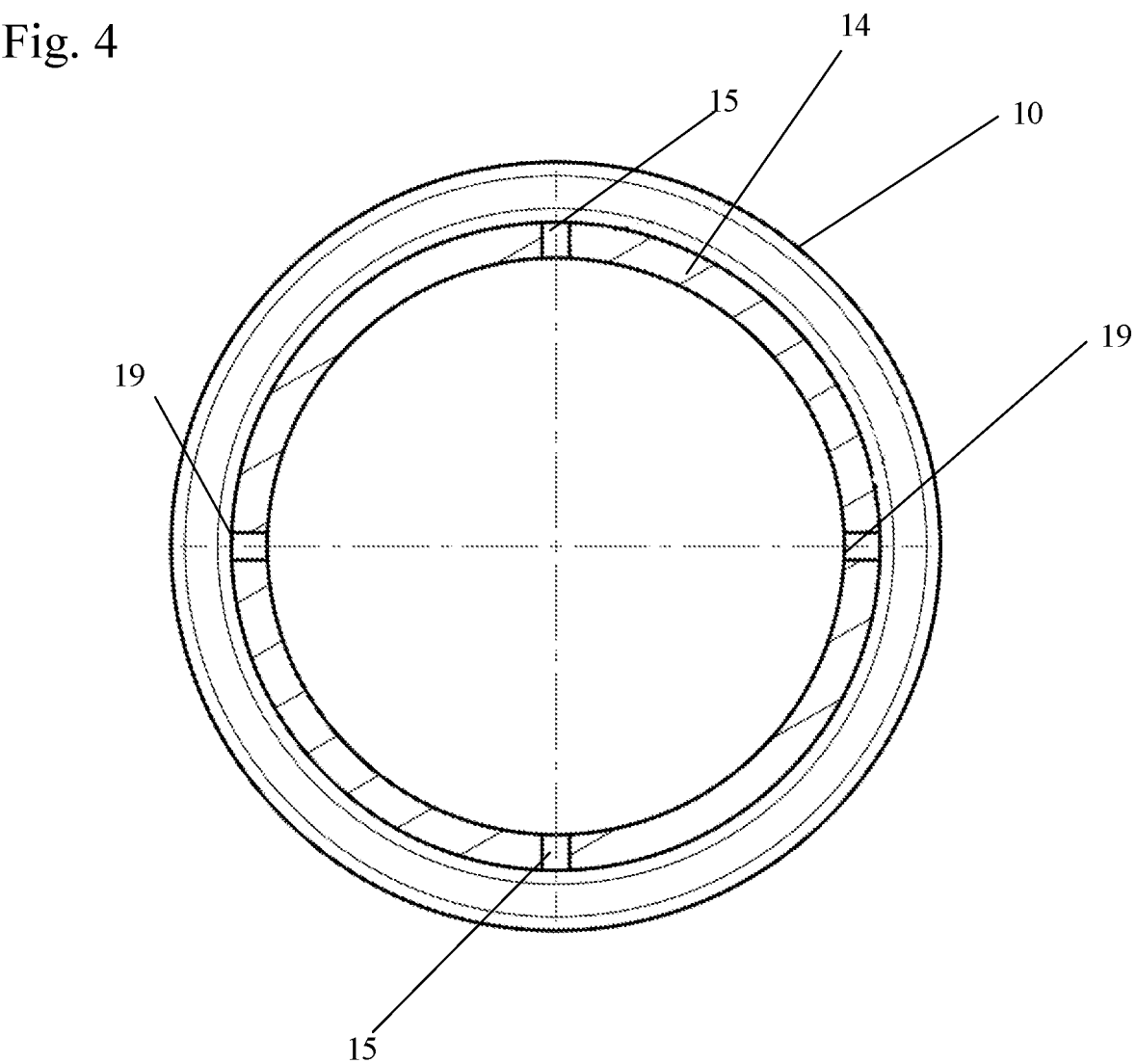
FIG. 4 shows a sectional view of the piston along line 4-4 of FIG. 3.

FIGS. 1-4 show a hydraulic tensioner 1 of a first embodiment. In this embodiment, the hydraulic tensioner 1 has a body 10 which is mounted via bolts received in bolt holes 12 to an engine in a piston nose down position. The tensioner body 10 defines a cylindrical bore 11 for slidably receiving a hollow piston 14. The cylindrical bore 11 has a first end 11a, a second end 11b and a length 11c between the first end 11a and the second end 11b. Along the length 11c of the cylindrical bore 11 between the first end 11a and the second end 11b is a plurality of radial holes 26, 27, 28, 29, 30 which vent to atmosphere or a sump (not shown). The radial holes 26, 27, 28, 29, 30 are spaced apart a distance d.

Although the tensioner body 10 is shown having bolt holes 12 for mounting the tensioner body 10 to a stationery surface (not shown), the hydraulic tensioner 1 may alternatively be mounted in a cartridge-style mounting arrangement within the spirit of the invention, where the hydraulic tensioner 1 is mounted by a thread on the outside of the body 10. Furthermore, having the piston is nose down position is not required and the piston can be orientated in a nose up position without impacting the performance of the invention.

In one embodiment, the radial holes 26, 27, 28, 29, 30 are equidistant. In another embodiment, the distance d between each of the radial holes 26, 27, 28, 29, 30 is different. While the diameter of the radial holes 26, 27, 28, 29, 30 is shown as being the same or consistent, the diameter can vary to increase or decrease the flow rate of the fluid exiting the high pressure chamber 25. Furthermore, the diameter can vary along the length of the plurality of radial holes 26, 27, 28, 29, 30 (e.g. diameter which is larger at the cylindrical bore 11, smaller and then larger at the exit of the body 10).

The second end 11b of the bore 11 contains an inlet 16 in fluid communication with a reservoir 20 for pressurized source fluid. It is noted that the reservoir 20 is located within the body 10.

In another embodiment, the radial holes 26, 27, 28, 29, 30 are not equidistant.

The distance d between each of the radial holes 26, 27, 28, 29, 30 and the associated diameters can vary depending on the conditions of the chain being tensioned as well as other engine conditions and particulars.

The hollow piston 14 has a first nose end 14a and a second end 14b separated by a length with a plurality of lands 14e, 14f, 14g. Between the first nose end 14a and the second end 14b of the piston 14 is a first land 14e, a circlip groove 14d, a second land 14f, an annular vent groove 14h containing at least two cross drilled radial vents 15, 19, and a third land 14g. The two cross drilled radial vents 15, 19 result in four vent openings within the annular vent groove 14h of the piston 14. The drilled radial vents 15, 19 can have a constant diameter or a diameter which varies along the length of hole. For example, the drilled radial vents 15, 19 can have a first diameter 15a between the inner circumference 14c of the piston 14 and graduate to a larger, second diameter 15b at the outside of the piston 14 which would interact with the radial holes 26, 27, 28, 29, 30 of the body 10. An advantage of a larger, second diameter 15b is to decrease the preciseness in alignment required between the radial grooves 26, 27, 28, 29, 30 of the body 10 and the radial vents 15, 19 of the piston 14. The circlip groove 14d receives a circlip or a retaining clip (not shown). The hollow piston 14 has an inner circumference 14c. Within the inner circumference 14c of the hollow piston 14 near the first nose end 14a, a volume reducer 24 can optionally be present to vent and purge air from within the inner circumference 14c of the hollow piston 14.

A hydraulic pressure chamber 25 is defined by the inner circumference 14c of the hollow piston 14, the cylindrical bore 11, and a check valve assembly 18. Hydraulic fluid in the hydraulic pressure chamber 25 and compression spring 17 bias the piston 14 away from the body 10 of the tensioner 1.

The check valve assembly 18 is located at the second end 11b of the cylindrical bore 11 between the inlet 16 and the hydraulic pressure chamber 25. Although any check valve assembly 18 known in the art could be used, the check valve assembly 18 in the figures includes a retainer 35, a spring 22, a ball 19, a check valve seat 21, and a seal 23 and operates to allow fluid to flow from the inlet 16 into the hydraulic pressure chamber 25 and prevents fluid from the hydraulic pressure chamber 25 from exiting through the inlet 16.

As the piston 14 slidable moves inwards and outwards within the cylindrical bore 11 of the housing 10, the radial vent holes 15, 19 of the piston 14 align with at least one of the plurality of radial holes 26, 27, 28, 29, 30 of the body 10 of the tensioner 1 to vary the fluid amount and pressure of the fluid present in the hydraulic pressure chamber 25.

When the radial vent holes 15, 19 are aligned with one of the plurality of radial holes 26, 27, 28, 29, 30 of the body 10 of the tensioner, the piston 14 additionally blocks the flow of fluid from exiting the other radial holes, thus allowing the position of the piston 14 to control the flow and damping relative to the high pressure chamber 25 at any given position of the piston 14. Furthermore, for each position of the piston 14 within the body 10, the flow of fluid, as well as the damping and hydraulic spring rate are controllable based on placement and diameter of the radial holes 26, 27, 28, 29, 30 of the body 10 of the tensioner 1 and the vent holes 15, 19 of the piston 14. Furthermore, to extend or provide additional play in allowing the vent hole 14 to align with one of the radial holes 26, 26, 28, 29, 30, the length of the annular groove 14*h* on the piston 14 which contains the vent holes 15, 19 can be lengthened or shortened.

The placement and diameter of the radial holes as well as the radial vent holes can vary based on whether the hydraulic tensioner is tensioning a new chain or worn chain.

Figure 5:
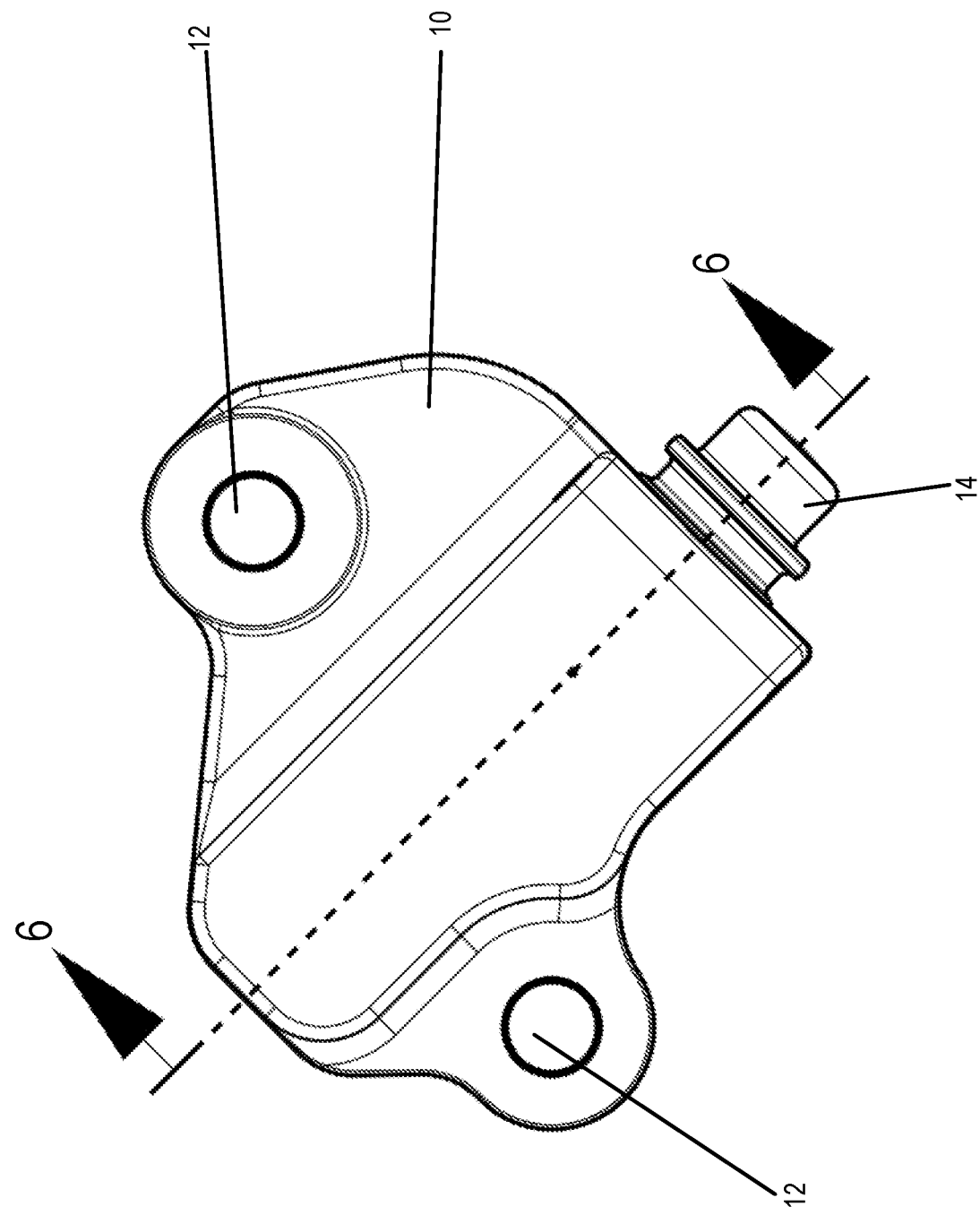
FIG. 5 shows a hydraulic tensioner in a nose down position of a second embodiment.
Figure 6:
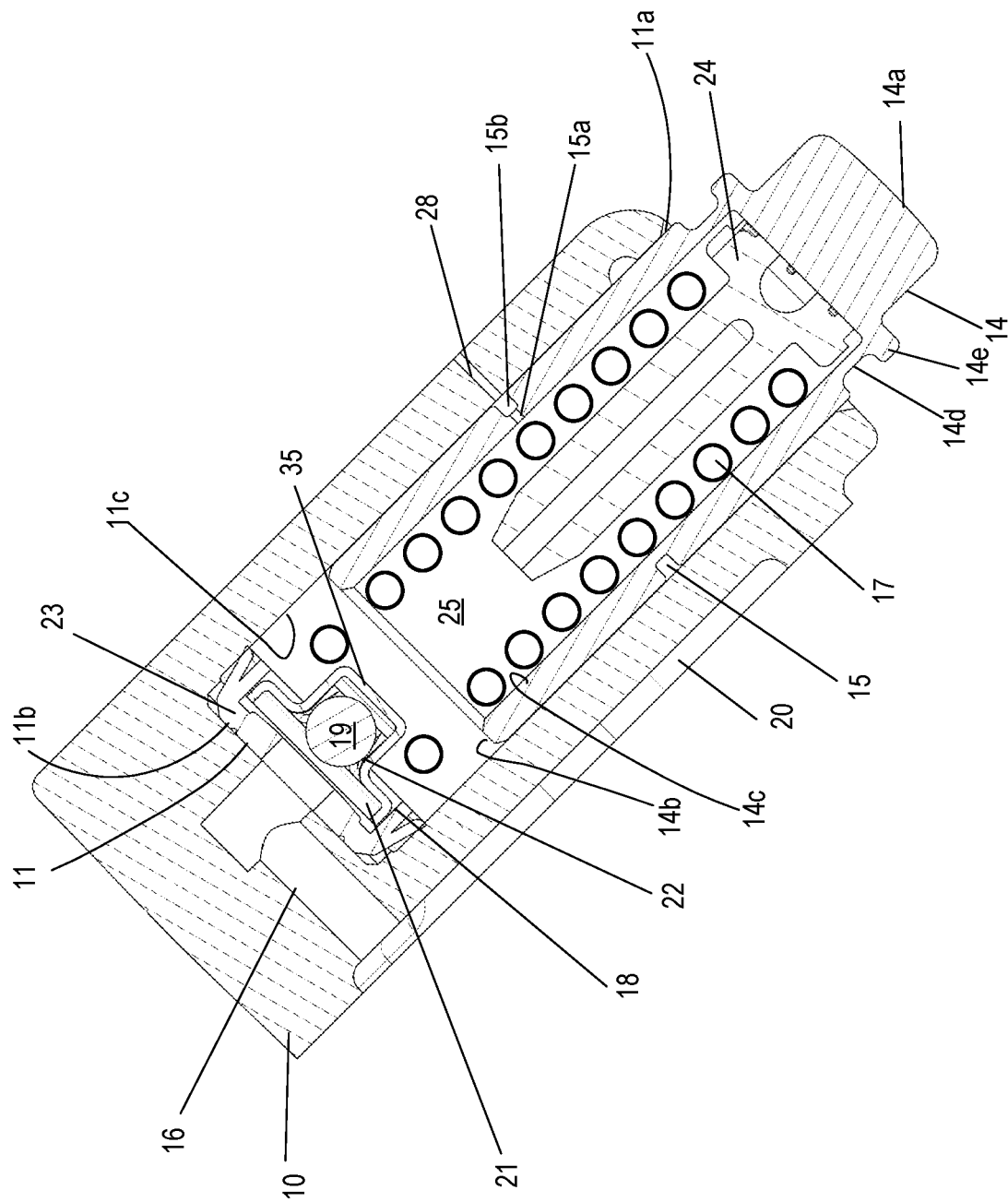
FIG. 6 shows a sectional view of FIG. 5 along line 5-5.
Figure 7:
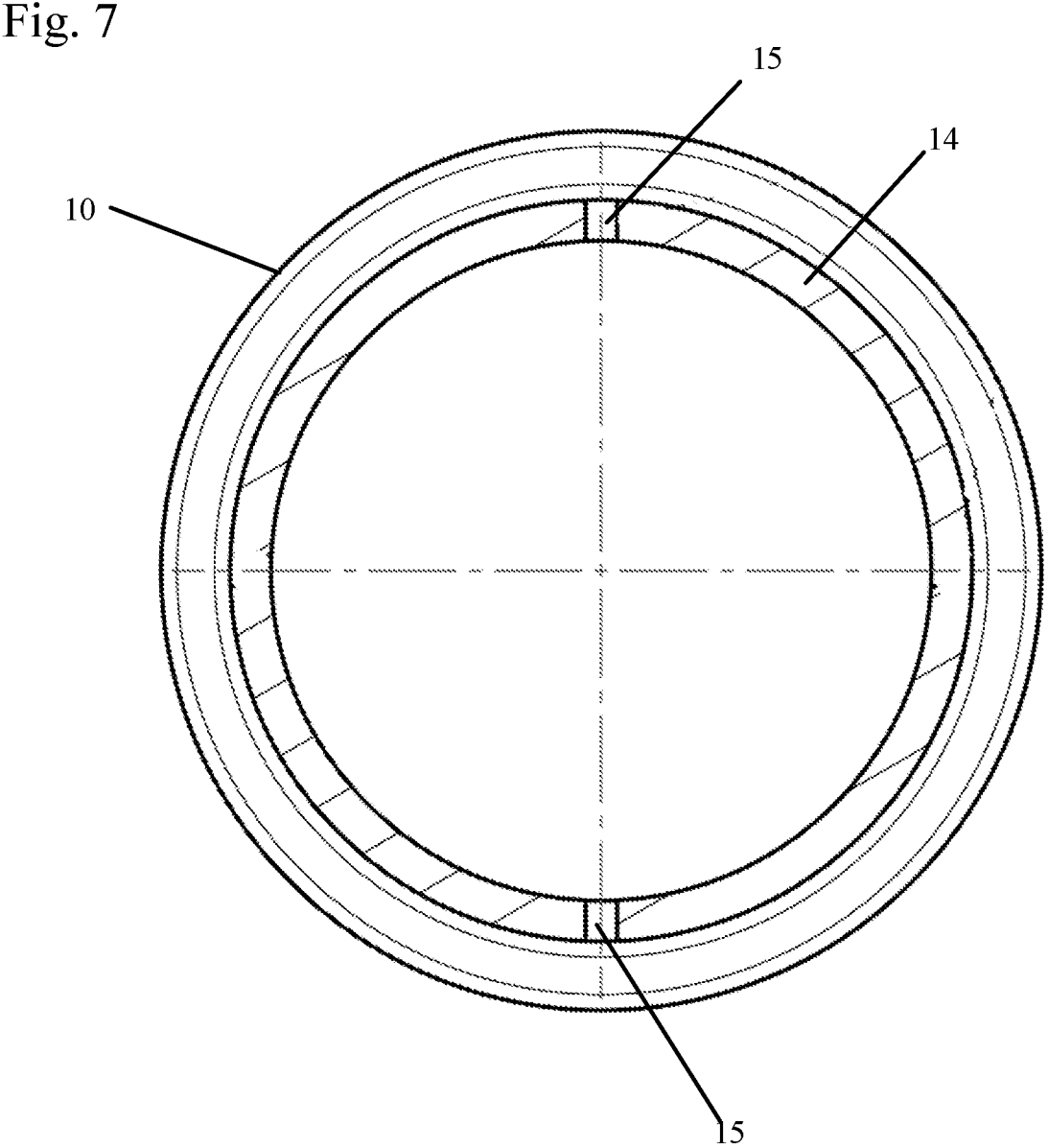
FIG. 7 shows a sectional view of the piston of the hydraulic tensioner of FIG. 5.
Figure 8:
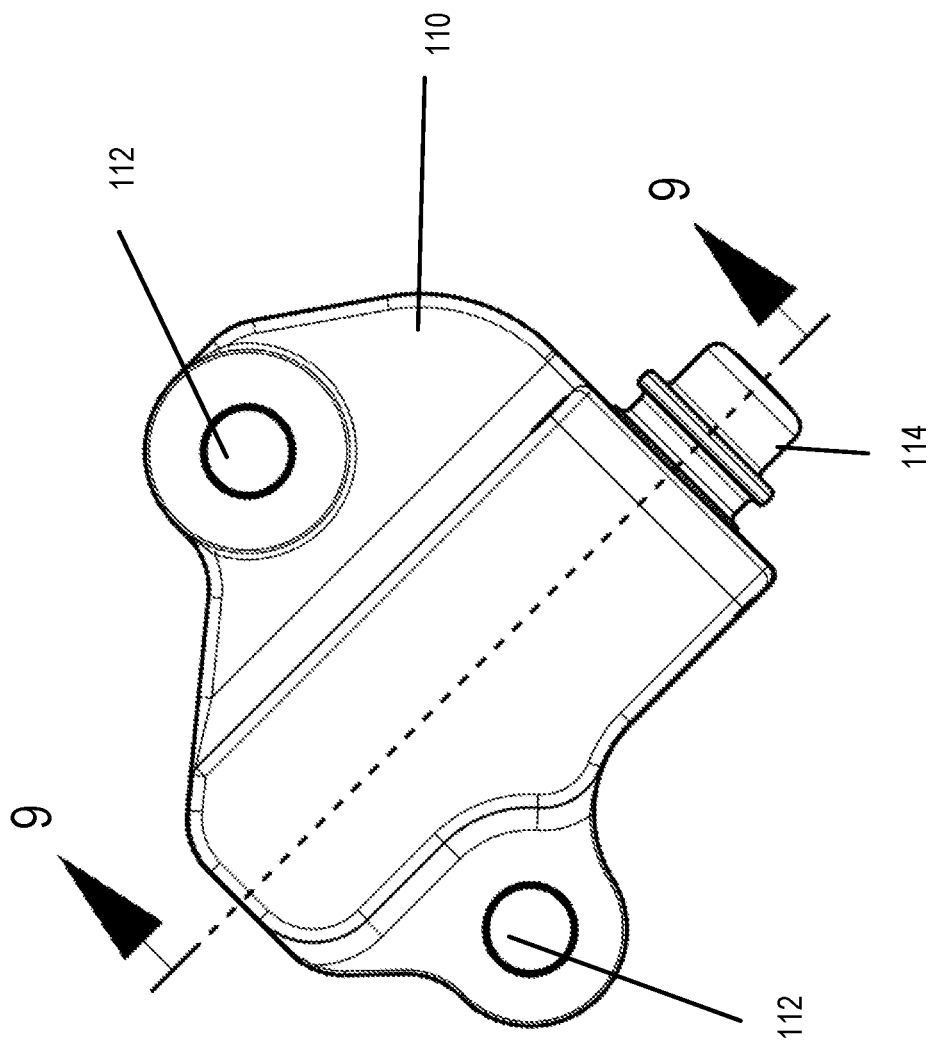
FIG. 8 shows a hydraulic tensioner in a nose down position of a third embodiment.
Figure 9:
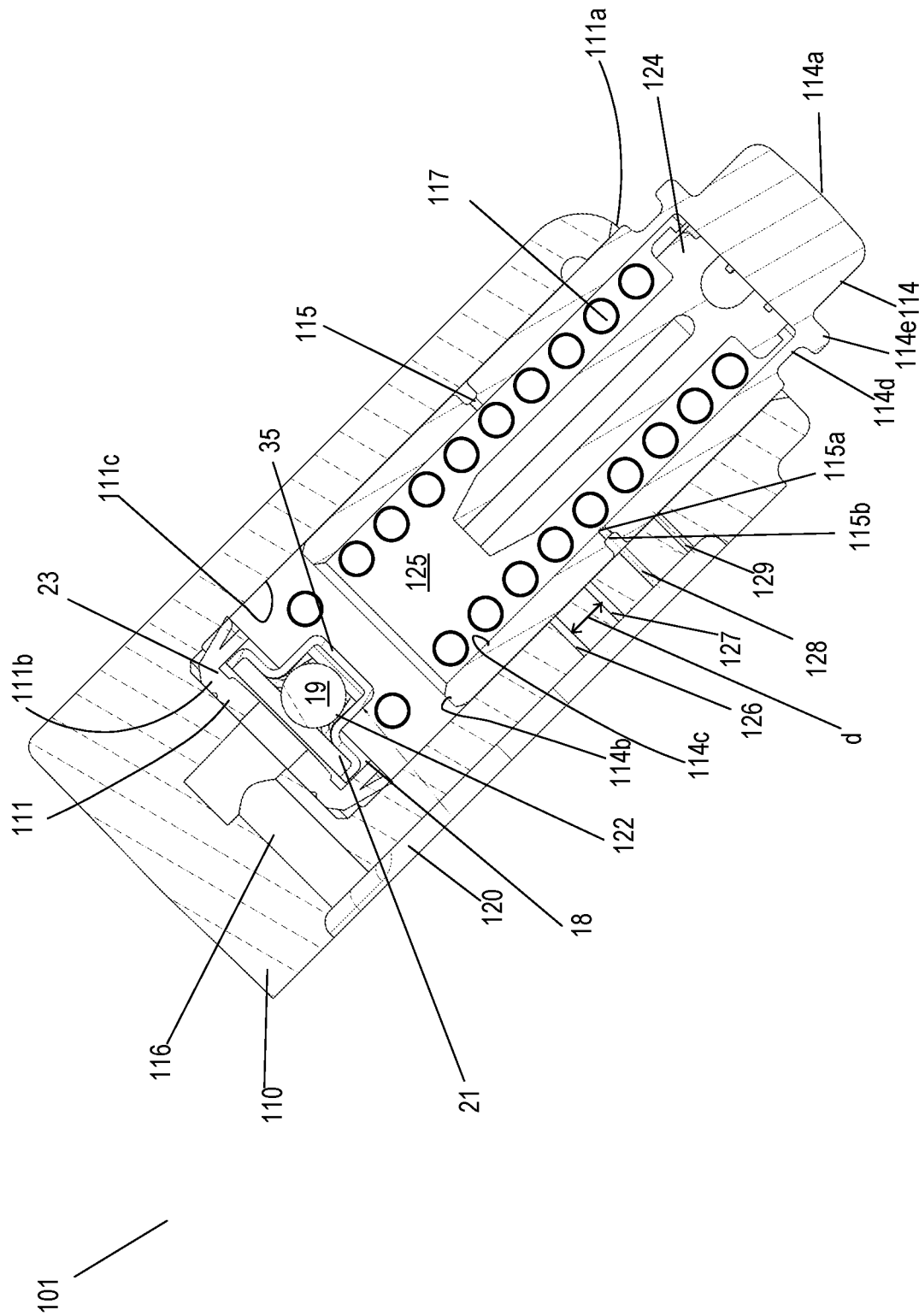
FIG. 9 shows a sectional view of FIG. 8 along line 9-9.
Figure 10:
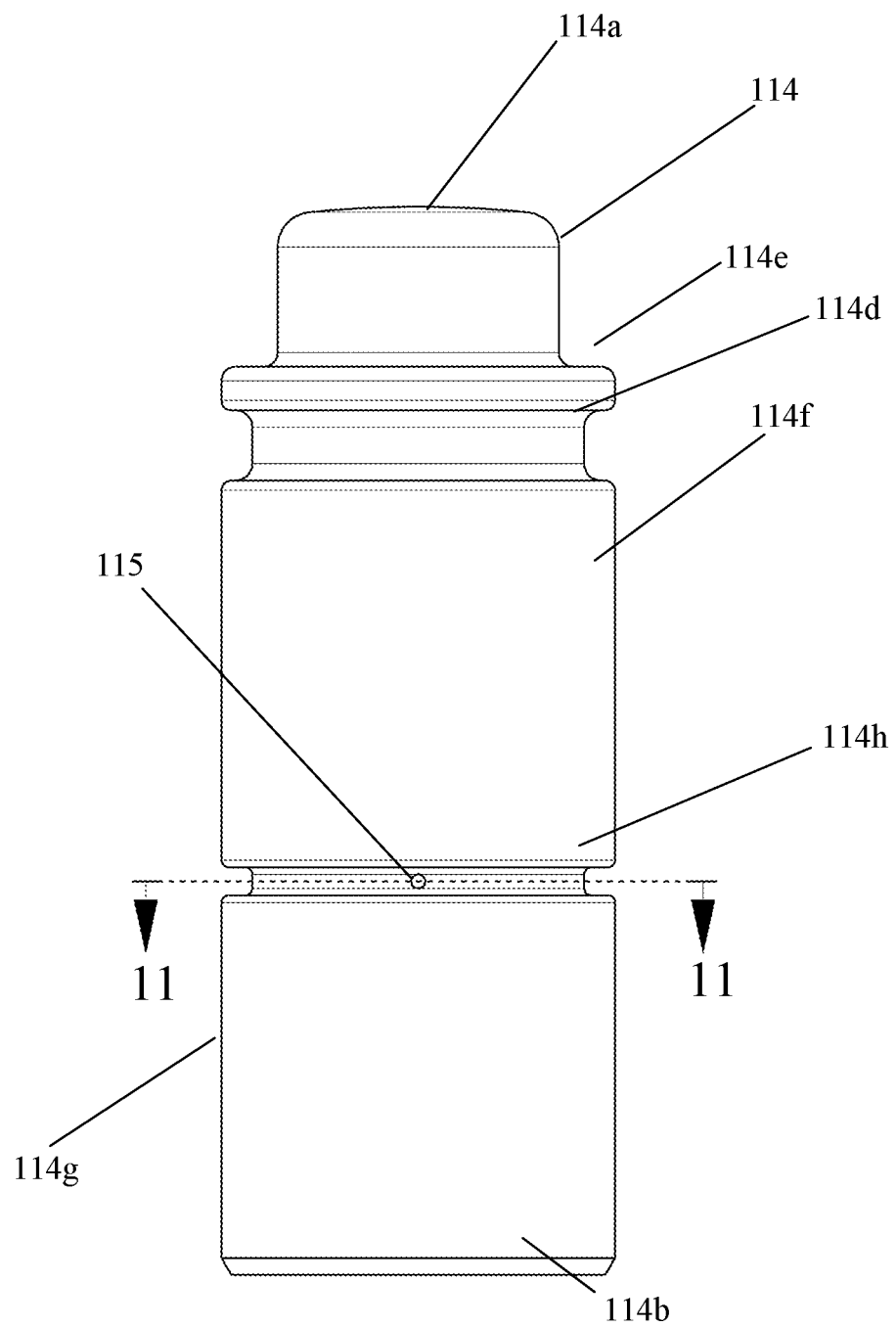
FIG. 10 shows the piston of the hydraulic tensioner of FIG. 8.
Figure 11:
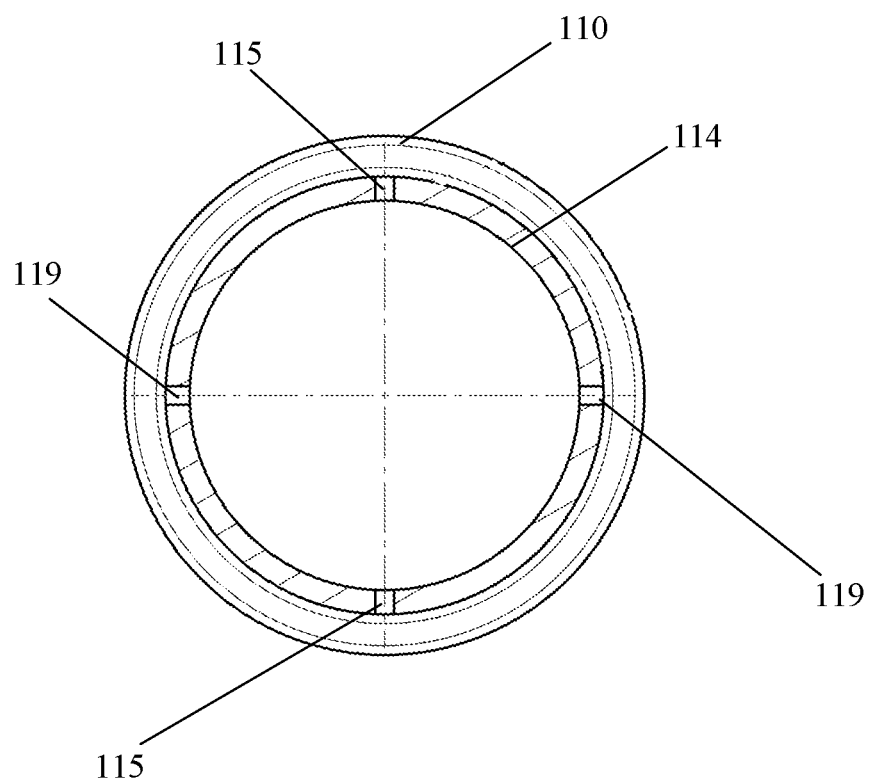
FIG. 11 shows a sectional view of the piston along line 11-11 of FIG. 10.

In an alternate embodiment, the plurality of radial holes 26, 27, 28, 29, 30 in the body 10 is replaced by a single radial hole 28 in the body 10 of the tensioner 1 as shown in FIGS. 5-7 as well as a single cross drilled radial hole 15 in the piston 14. The single cross drilled radial hole 15 of the piston 14 has two openings in the annular groove 14*h* of the piston 14.

FIGS. 8-11 show another embodiment of the present invention. A hydraulic tensioner 101 has a body 110 which is mounted via bolts received in bolt holes 112 to an engine in a piston nose down position. The tensioner body 110 defines a cylindrical bore 111 for slidably receiving a hollow piston 114. The cylindrical bore 111 has a first end 111*a*, a second end 111*b* and a length 111*c* between the first end 111*a* and the second end 111*b*. Along the length 111*c* of the cylindrical bore 111 between the first end 111*a* and the second end 111*b* is a plurality of radial holes 126, 127, 128, 129, 130 which vent to a reservoir 120 defined by the body 110 of the tensioner and supplies fluid to an inlet 116 of the hydraulic tensioner 101. The radial holes 126, 127, 128, 129, 130 are spaced apart a distance d.

In one embodiment, the radial holes 126, 127, 128, 129, 130 are equidistant. In another embodiment, the distance d between each of the radial holes 126, 127, 128, 129, 130 is different. While the diameter of the radial holes 126, 127, 128, 129, 130 is shown as being the same or consistent, the diameter can vary to increase or decrease the flow rate of the fluid exiting the high pressure chamber 125. Furthermore, the diameter can vary along the length of the plurality of radial holes 126, 127, 128, 129, 130 (e.g. diameter which is larger at the cylindrical bore 111, smaller and then larger at the exit of the body 110).

In another embodiment, the radial holes 126, 127, 128, 129, 130 are not equidistant.

The distance d between each of the radial holes 126, 127, 128, 129, 130 and the associated diameters can vary depending on the conditions of the chain being tensioned as well as other engine conditions and particulars.

The second end 111*b* of the bore 111 contains an inlet 116 in fluid communication with a reservoir 120 for pressurized source fluid. It is noted that the reservoir 120 is located within the body 110.

The hollow piston 114 has a first nose end 114*a* and a second end 114*b* separated by a length with a plurality of lands 114*e*, 114*f*, 114*g*. Between the first nose end 114*a* and the second end 114*b* of the piston 114 is a first land 114*e*, a circlip groove 114*d*, a second land 114*f*, an annular vent groove 114*h* containing at least two cross drilled radial vents 115, 119, and a third land 114*g*. The two cross drilled radial vents 115, 119 result in four vent openings within the annular vent groove 114*h* of the piston 114.

The drilled radial vents 115, 119 can have a constant diameter or a diameter which varies along the length of hole. For example, the drilled radial vents 15, 119 can have a first diameter 115*a* between the inner circumference 114*c* of the piston 114 and graduate to a larger, second diameter 115*b* at the outside of the piston 114 which would interact with the radial holes 126, 127, 128, 129, 130 of the body 110. An advantage of a larger, second diameter 115*b* is to decrease the preciseness in alignment required between the radial grooves 126, 127, 128, 129, 130 of the body 110 and the radial vents 115, 119 of the piston 114. The circlip groove 114*d* receives a circlip or a retaining clip (not shown). The hollow piston 114 has an inner circumference 114*c*. Within the inner circumference 114*c* of the hollow piston 114 near the first nose end 114*a*, a volume reducer 124 can optionally be present to vent and purge air from within the inner circumference 114*c* of the hollow piston 114.

A hydraulic pressure chamber 125 is defined by the inner circumference 114*c* of the hollow piston 114, the cylindrical bore 111, and a check valve assembly 18. Hydraulic fluid in the hydraulic pressure chamber 125 and compression spring 117 bias the piston 114 away from the body 110 of the tensioner 101.

The check valve assembly 118 is located at the second end 111*b* of the cylindrical bore 111 between the inlet 116 and the hydraulic pressure chamber 125. Although any check valve assembly 118 known in the art could be used, the check valve assembly 118 in the figures includes a retainer 35, a spring 22, a ball 19, a check valve seat 21, and a seal 23 and operates to allow fluid to flow from the inlet 116 into the hydraulic pressure chamber 125 and prevents fluid from the hydraulic pressure chamber 125 from exiting through the inlet 116. As the piston 114 slidable moves inwards and outwards within the cylindrical bore 111 of the housing 110, the radial vent holes 115, 119 of the piston 114 aligns with at least one of the plurality of radial holes 126, 127, 128, 129, 130 of the body 110 of the tensioner 101 to vary an outward flow area defined between the piston 114 and the bore 111, thus changing the stiffness/damping characteristics of the tensioner as the flow area effectively changes by exposing and covering a different size or different number of radial holes 126, 127, 128, 129, 130 in the body that are exposed to the two cross drilled radial vents 115, 119 of the piston 114 and thus to the compressed oil in the high pressure reservoir 125.

When the radial vent holes 115, 119 are aligned with one of the plurality of radial holes 126, 127, 128, 129, 130 of the body 110 of the tensioner, the piston 114 additionally blocks the flow of fluid from exiting the other radial holes, thus allowing the position of the piston 114 to control the flow relative to the high pressure chamber 125 at any given position of the piston 114. Furthermore, each position of the piston 114 within the body 110, the flow of fluid, as well as the damping and hydraulic spring rate are controllable based on placement of the radial holes 126, 127, 128, 129, 130 of the body 110 of the tensioner 1 and the vent holes 115, 119 of the piston 114. Furthermore, to extend or provide additional play in allowing the vent hole 114 to align with one of the radial holes 126, 126, 128, 129, 130, the length of the annular groove 114h on the piston 114 which contains the vent hole 115, 119 can be lengthened or shortened.

Figure 12:
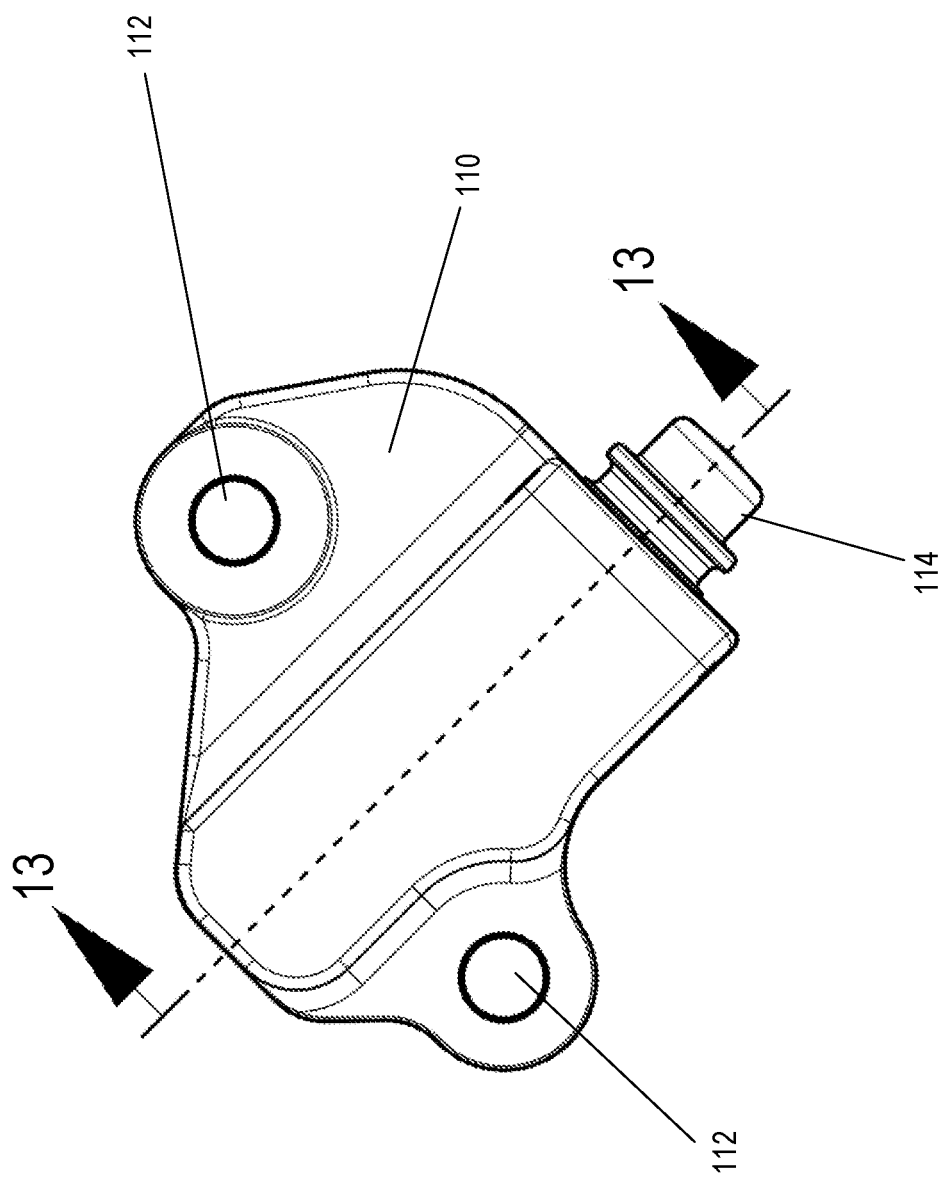
FIG. 12 shows a hydraulic tensioner in a nose down position of a fourth embodiment.
Figure 13:
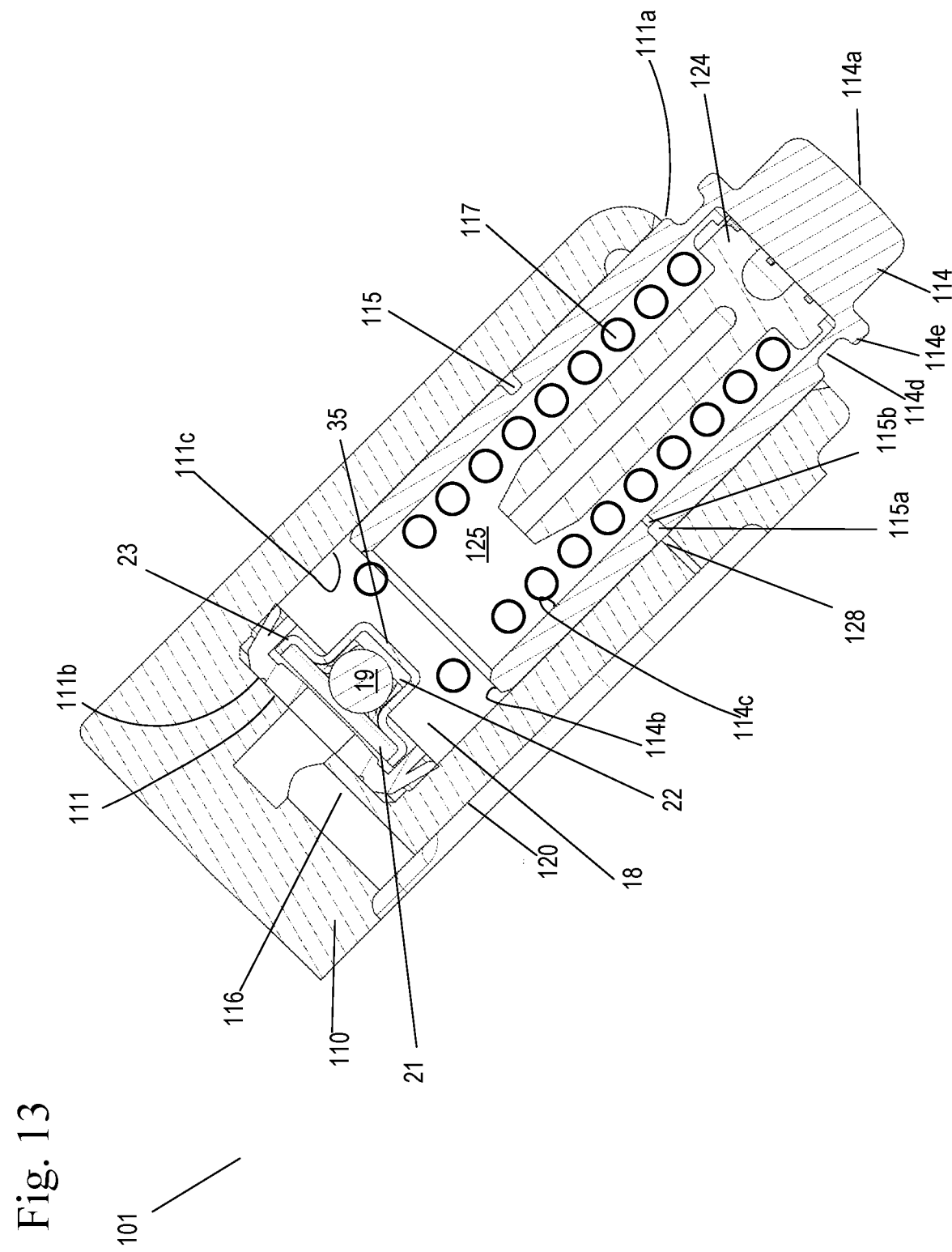
FIG. 13 shows a sectional view of FIG. 12 along line 13-13.
Figure 14:
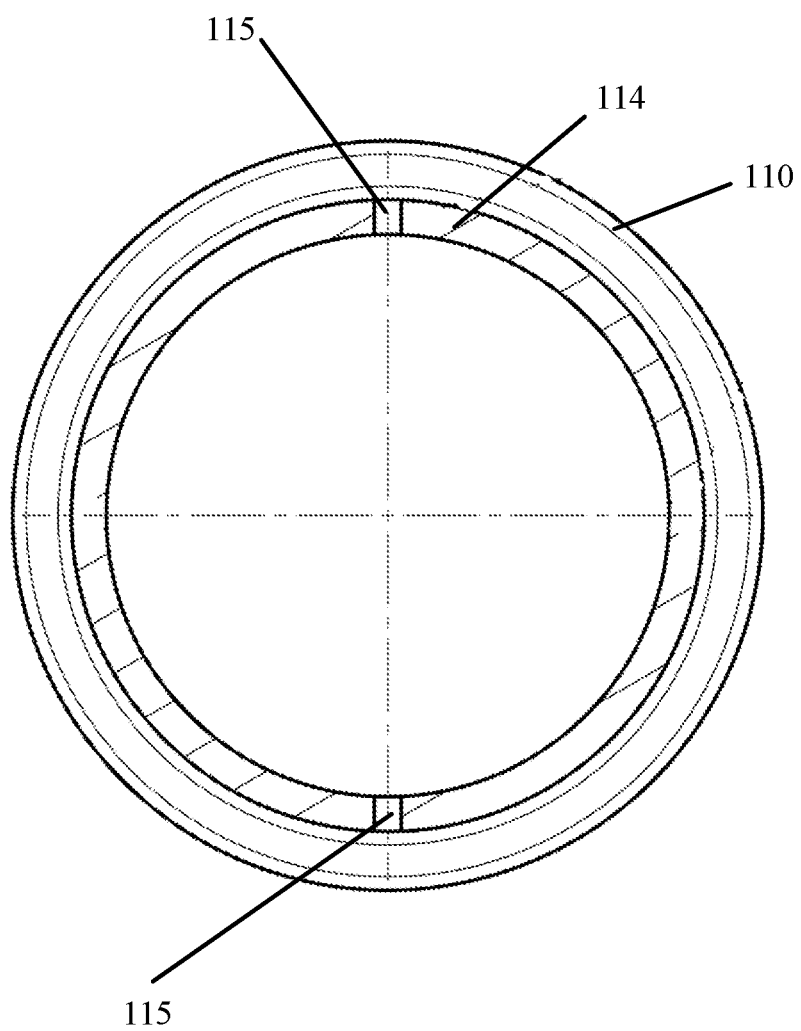
FIG. 14 shows a sectional view of the piston of the hydraulic tensioner of FIG. 13.

In an alternate embodiment, the plurality of radial holes in the body is replaced by a single radial hole 128 in the body 110 of the tensioner 101 as shown in FIGS. 12-14 as well as a single cross drilled radial hole 115 equating to two openings in the annular groove of the piston 114.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A hydraulic tensioner comprising:
   a tensioner body defining a bore having a first end and a second end separated by a length, the second end being in fluid communication with a source of pressurized fluid through an inlet;
   at least one radial hole along the length of the bore of the tensioner body between the first end and the second end of the bore;
   a hollow piston slidably received within the bore, the piston having a first end and a second end separated by a length;
   at least one radial cross drilled vent hole along the length of the piston;
   a hydraulic pressure chamber defined by the hollow piston and the bore of the tensioner body;
   a piston spring received within the hydraulic pressure chamber for biasing the piston away from the inlet; and
   wherein as the piston moves within the bore of the tensioner body to at least one position in which the at least one radial cross drilled vent hole aligns with the at least one radial hole along the length of the bore of the tensioner body, venting fluid from the hydraulic pressure chamber, such that the damping of the hydraulic tensioner increases at the at least one position.

2. The hydraulic tensioner of claim 1, wherein the tensioner body further defines a reservoir connected to the inlet.

3. The hydraulic tensioner of claim 1, further comprising a check valve assembly.

4. The hydraulic tensioner of claim 1, wherein the at least one radial hole is a plurality of radial holes are in fluid communication with the bore and a reservoir defined by the tensioner body and connected to the inlet.

5. The hydraulic tensioner of claim 1, wherein the at least one radial hole is a plurality of radial holes are in fluid communication with the bore and the inlet.

6. The hydraulic tensioner of claim 1, wherein the plurality of radial holes are equidistant.

7. The hydraulic tensioner of claim 1, wherein the at least one radial hole is a plurality of radial holes in fluid communication with the bore and a sump.

8. The hydraulic tensioner of claim 1, wherein the at least one radial cross drilled vent hole has a first end and a second end, the first end and the second end having a different diameter.

9. The hydraulic tensioner of claim 1, wherein the tensioner body has a single radial hole along the length of the bore of the tensioner body and a single radial cross drilled vent hole in the piston.

10. The hydraulic tensioner of claim 1, wherein the tensioner body has at least five radial holes along the length of the bore of the tensioner body and at least two radial cross drilled vent holes in the piston.

11. The hydraulic tensioner of claim 1, wherein the tensioner body has four radial holes along the length of the bore of the tensioner body and one radial cross drilled vent hole in the piston.

12. The hydraulic tensioner of claim 1, wherein the tensioner body has four radial holes along the length of the bore of the tensioner body and at least two radial cross drilled vent holes in the piston.

13. The hydraulic tensioner of claim 1, wherein the tensioner body has three radial holes along the length of the bore of the tensioner body and at least two radial cross drilled vent holes in the piston.

14. The hydraulic tensioner of claim 1, wherein the tensioner body has three radial holes along the length of the bore of the tensioner body and one radial cross drilled vent hole in the piston.

15. The hydraulic tensioner of claim 1, wherein the tensioner body has two radial holes along the length of the bore of the tensioner body and at least two radial cross drilled vent holes in the piston.

16. The hydraulic tensioner of claim 1, wherein the tensioner body has two radial holes along the length of the bore of the tensioner body and one radial cross drilled vent hole in the piston.

17. The hydraulic tensioner of claim 1, wherein the tensioner body has five radial holes along the length of the bore of the tensioner body and one radial cross drilled vent hole in the piston.

18. The hydraulic tensioner of claim 1, wherein the tensioner body has a single radial hole along the length of the bore of the tensioner body and at least two radial cross drilled vent holes in the piston.

* * * * *